United States Patent [19]

Norton, Jr. et al.

[11] Patent Number: 5,497,356

[45] Date of Patent: Mar. 5, 1996

[54] METHOD AND APPARATUS FOR VERIFYING THE LOCATION OF A SEISMIC BOTTOM CABLE IN REAL TIME

[75] Inventors: John P. Norton, Jr., Houston; William H. Behrens, Rosenberg, both of Tex.

[73] Assignee: Western Atlas International, Houston, Tex.

[21] Appl. No.: 435,985

[22] Filed: May 5, 1995

[51] Int. Cl.⁶ ..................................................... G01V 1/38
[52] U.S. Cl. ................................ 367/6; 367/19; 367/130
[58] Field of Search ................................ 367/6, 19, 106, 367/130

[56] References Cited

U.S. PATENT DOCUMENTS

| | | | |
|---|---|---|---|
| 4,446,538 | 1/1984 | Zachariadis | 367/19 |
| 4,532,617 | 7/1985 | Baecker et al. | 367/19 |
| 4,641,287 | 2/1987 | Neeley | 367/19 |
| 4,912,682 | 3/1990 | Norton, Jr. et al. | 367/19 |
| 5,128,904 | 7/1992 | Chambers | 367/19 |

OTHER PUBLICATIONS

Cross, P. A. Kalman Filtering and its Application to Offshore Position–Fixing, paper presented at Hydro '86, the Fifth Biennial International Symposium of the Hydrographic Society, Dec. 1986, Southampton, England, pp. 19–25 (The Hydrographic Journal No. 44, Apr. 1987).

Primary Examiner—Daniel T. Pihulic
Attorney, Agent, or Firm—William A. Knox

[57] ABSTRACT

One or more slave acoustic transponders are secured to selected parts of a seismic bottom cable whose location is imperfectly known. A master transponder broadcasts an interrogation pulse from each of a number of different, known locations distributed along a line of survey. In response to an interrogation pulse, a slave transponder emits an encoded signal that is received by the master transponder. The acoustic flight time between each pulse broadcast and encoded-signal reception constitutes a range measurement to the participating slave transponder. Resolving a gather of several range measurement from different known broadcast locations, focussed on an identifiable transponder, defines the transponder location.

7 Claims, 5 Drawing Sheets

METHOD AND APPARATUS FOR VERIFYING THE LOCATION OF A SEISMIC BOTTOM CABLE IN REAL TIME

BACKGROUND OF THE INVENTION

1. Field of the Invention

A method for verifying the actual location of a seismic sensor array following deployment thereof on the sea floor by a tender vessel. The verification exercise is carried out independently of routine seismic operations.

2. Discussion of Related Art

As is well known, in the art of geophysical surveying and in particular, seismic exploration, an acoustic source launches a wavefield into the earth at a first selected source location along a line of survey. A plurality of seismic receivers or sensors, spaced-apart by a selected spatial interval, are deployed along the survey line for receiving the wavefield after it has undergone reflection from subsurface earth layers. After each wavefield launching, the source or the associated sensors or both are advanced along the survey line by intervals usually equal to a multiple of the sensor spacing. The sensors convert the mechanical reflected seismic signals to electrical signals which are transmitted to a multichannel archival data storage and processing device over wire lines or optical or ethereal signal transmission means of any desired type. As a matter of interest, seismic signals fall into the sub to low audio acoustic band of from about 5 to 100 Hertz (Hz)

In marine seismic surveying, particularly in shallow water on the order of 100 meters or less, one or more arrays of seismic sensors may be mounted in a so-called bottom cable which includes a plurality of data channels. There may be a plurality of individual data channels, one for each sensor, or the seismic signals from many sensors may share a single channel using well-known time-division or frequency division multiplexing methods. The spacing between sensors may typically be about 100 meters. In another type of operation, the sensors may be mounted in anchored buoys and the seismic signals are transmitted to the recording device over one or more ethereal channels.

In shallow-water operation, a cable-carrying boat, guided by a desired type of navigation system such as SYLEDIS or the GPS system, deploys one or more bottom cables at preplotted locations along the intended line of survey. Ten to twenty kilometers of cable may be laid out in one operation as desired. The seismic sensors are built directly into the bottom cable which is designed to be heavy such that it sinks to and remains on the sea floor in contrast to the neutrally buoyant streamer cables that are used in deep-water operations. A recording boat recovers an end of the cable and connects the cable to recording and processing equipment whereupon a shooting boat sails down the line at a desired velocity such as six knots, launching an acoustic pulse at selected spatial intervals in any well-known manner There may be a considerable period (such as days) between the time that the cable is laid out and the time that the recording boat is ready to gather reflection data. In the meantime, the cable drifts with the sea currents, it may become snagged in fishing trawls and displaced or otherwise moved from its originally intended location. In fact, there is no assurance that the cable, fluttering down through the water as it is being laid out, actually lands at the desired preplotted location on the sea floor. It is therefore necessary to verify the cable and sensor location before commencing data-gathering operations. Verification must be done in real time so that the cable can be repositioned if it has perchance been displaced by more than some pre-ordained spatial tolerance.

U. S. Pat. No. 4,446,538 issued May 1, 1984 to R. G. Zachariadis teaches an acoustic positioning system for locating a marine bottom cable at an exploration site, the cable employs a plurality of hydrophones in spaced-apart positions along the cable. A marine vessel measures water depth to the cable as the vessel passe over the cable and then interrogates the hydrophones with sonar pulses along a slant range as the vessel travels along a parallel horizontally offset path to the cable. The location of the hydrophones is determined from the recordings of the water depth and the slant range. There are two disadvantages to that system, the first of which is that the cable location is not known until after the seismic data have been processed so that if the cable is out of position, a portion of the line would have to be re-surveyed. The other objection is a matter of economy in that the auxiliary boat must make two passes over the cable, one pass to determine water depth and the second pass to generate a set of slant ranges.

Another method for locating a bottom cable is taught by W. P. Neeley in U.S. Pat. No. 4,641,287, issued Feb. 3, 1987. Here is disclosed a method for locating an ocean bottom seismic cable wherein a series of shots from a seismic pulse generator are fired. The distance to one seismic pulse detector is determined for each shot by defining spherical surfaces upon which the detector may be located. The intersection of the spherical surfaces determine the exact location of the detector. Depth detectors may be used to eliminate half the possible locations for each shot. Here again, the range measurements are a by-product of normal seismic data-gathering. The results are not available until after the data have been processed and possibly by that time, the field crew is long gone from the area of survey. In both of the above methods, in relatively shallow water where such bottom cables are used, the range measurements depend on measuring the elapsed time of a first-arriving acoustic pulse that has traveled directly through the water from source to detector and upon knowledge of the water velocity.

Acoustic pulses in the seismic frequency band, in the presence of shallow water, usually follow a direct path to some critical point and thereafter the first-arriving pulse follows a refracted path through the ocean bottom. It is difficult to sort out the direct from the refracted arrivals. Direct arrivals can provide valid range measurements. Refracted arrivals may not do so. Other problems involving ambiguity in acoustic ranging using pulses in the seismic frequency band arise due to reverberation between the water surface and the sea floor and, at long ranges, the probability of wide-angle reflection paths. Thus, acoustic ranging using frequencies selected from the normal seismic frequency band, is unreliable.

A somewhat different location-verification approach is taught by U.S. Pat. No. 5,128,904, issued Jul. 7, 1992 to Ron Chambers and assigned to the assignee of this invention. A method is disclosed for determining the separation between a seismic energy source and a seismic sensor whose location is known imperfectly. After the source emits a wavefield, the first-arriving impulse at the sensor is statistically processed to form a range statistic that is related to the travel time between the source and the sensor. A set of range statistics from a plurality of source positions are filtered and converted to range loci, the intersection of which marks the location of the sensor. Although this method does not suffer from the ambiguous travel-path problems of the two previous references, it is a by-product of data processing so that positioning errors cannot be corrected in the field in real time.

A method that specifically applies to moving neutrally buoyant streamer cables is taught by U.S. Pat. No. 4,532,617 issued Jul. 31, 1985 to D. R. Baeker et al., depends upon acoustic ranging from a slave vessel having known coordinates. That method could, perhaps be adapted for use with an ocean-bottom cable, although it requires cooperation with a master recording vessel.

To reiterate, all of the known methods for verifying the bottom-cable location are a by-product of post-survey data processing. That is, the operator in the field knows not where the seismic transducer array IS but only where it WAS. Furthermore, known methods require use of expensive survey vessels filled with sophisticated seismic equipment operated by senior technicians.

There is a need for a bottom-cable location verification system for use in shallow water that can provide real-time information so that the seismic sensor arrays coupled to a bottom cable can be properly repositioned as needed prior to commencement of the actual seismic survey or the conduct of the survey may be modified to fit the cable location.

SUMMARY OF THE INVENTION

A system is provided for estimating the locations of the members of a distributed submerged array of acoustic sensors. A plurality of slave transponders are intimately associated with selected members of the sensor array. Each transponder to emit a unique signal in response to an interrogation pulse from a master transponder. A utility boat, equipped with a swing pole is cruises in the vicinity of the distributed submerged sensor array. The utility boat carries a navigation means whose antenna is secured to the free upper end of the vertically-disposed swing pole. A master transponder is fastened to the submerged lower end of the swing pole. A controller that is operatively coupled to the master transponder, triggers the master transponder at selected time intervals to broadcast an interrogation pulse. In response to the interrogation pulse, each slave transponder returns an unique encoded reply signal to the master transponder. For each transponder, the flight times between each pulse broadcast and the encoded response reception are measured with respect to the coordinates of the utility boat to provide a plurality of encoded observed ranges which are stored in a range pool means. Collating means assign the respective unambiguous encoded observed ranges to the appropriate identifiable transponders. Resolver means, interconnected with the navigation means and the collating means, resolves the plurality of range measurements assignable to each transponder with the corresponding instantaneous coordinates of the utility boat.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
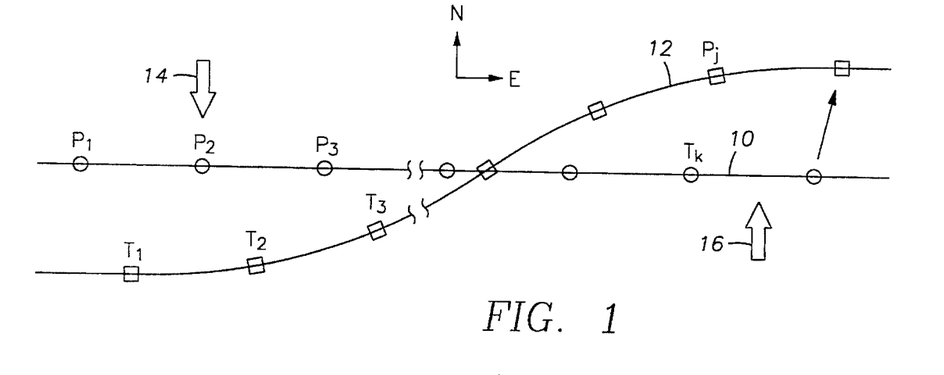
FIG. 1 is a plan view of a bottom seismic cable resting on the sea floor.

FIG. 1 is a plan view of a proposed seismic line of survey 10, including desired preplotted sensor stations $P_1$, $P_2$, ... $P_j$ where j is the total number of preplotted stations to be occupied. Bottom cable 12, previously laid out, contains a plurality of spaced-apart seismic sensors with which are associated transponders T1, T2, T3, Tk, where k is the number of sensors deployed. Differential sea currents as represented by arrows 14 and 16 have shifted the bottom cable south and north of the proposed survey line as shown.

Figure 2:
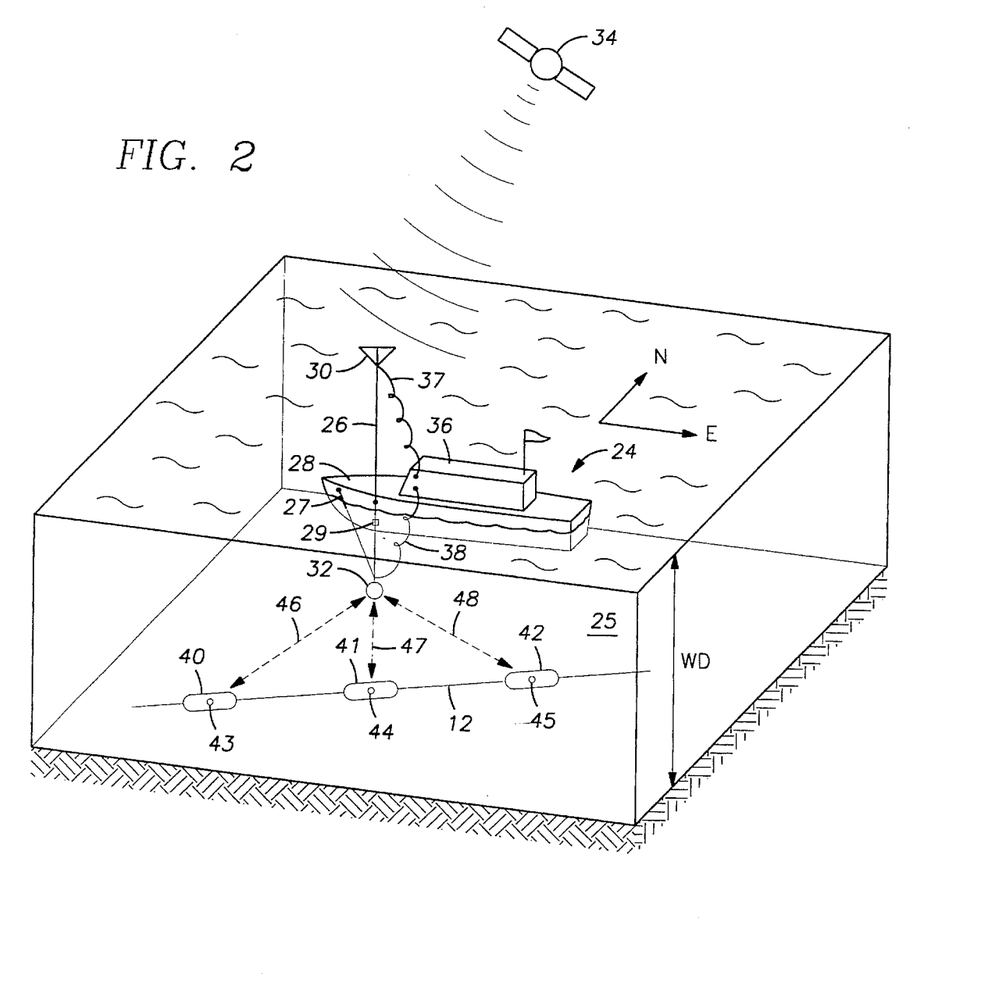
FIG. 2 shows a utility boat and its equipment used to locate a misplaced bottom cable.

The actual locations of the seismic sensors is determined with the aid of a utility boat 24, FIG. 2. Utility boat 24, shown floating in a body of water 25 may be a small inboard utility boat such as an inexpensive 24' cabin cruiser. A swing pole 26 is secured a gunwale 28 of utility boat 24, preferable pivoted at the center of gravity of the swing pole. In use, the swing pole 26 is vertically disposed as shown. The upper free end carries an antenna 30 for a precision navigation system such as the GPS satellite system. The lower, submerged end of the swing pole supports a master transponder 32. The swing pole is normally supported in an upright position when underway by a guy wire 27 in combination with a hull-mounted saddle 29 of any desired type. Preferably, the master transponder 32 is located well away from and beneath the boat keel to minimize boat-generated noise. A streamlined bubble shield may be provided immediately above the master transponder to deflect air bubbles caused by vortices swirling around the swing pole 26.

Signals received at antenna 30 from a constellation of satellites, symbolized by 34, are delivered to a compact satellite receiver such as the NAV 1000 made By MAGELLAN Corp. of Monrovia Calif. (not shown) inside cabin 36 over line 37.

Master transponder 32 is driven by a master controller (also not shown in FIG. 2, shown as 68 in FIG. 6) mounted on a rack in cabin 36 along with the satellite receiver. The master controller is the Model 2110 Shallow Water System Data Acquisition Unit (DAU) as provided by DigiCOURSE Inc. of New Orleans La. This unit is used in conjunction with an M2410 40 kHz transponder, to be discussed later, to accurately define the positions of the seismic receivers on ocean bottom cables or the equivalent. In operation, the DAU triggers the master transponder 32 which is fastened to the bottom of swing pole 26. The transponder, 32 which is preferably a model 2370 transponder also made by DigiCOURSE, is triggered by signals transmitted over line 38 at selected timed intervals such as one second. Transponder 32 broadcasts an interrogation pulse and thereafter listens for up to 0.6 second for the arrival uniquely encoded replies from various slave transponders. The listening time of 0.6 second corresponds to a two-way travel path or range, R, of about 500 meters at the nominal sea water velocity of 1500 meters per second. The DAU has provision to accept discrete responses from 512 slave transponders. The elapsed two-way flight time, τ, for each identifiable slave transducer is delivered to a range pool, to be discussed later, for real time processing.

Because the navigation antenna is directly above the master transponder, use of swing pole 26 makes it possible for the system to exactly correlate the instantaneous boat position in real time with the broadcast instant of the interrogation pulse. There is no need for making adjustments for lateral or temporal offsets between antenna and transponder.

Referring again to FIG. 2, there is shown a bottom cable, such as 12, lying on the sea floor 39. Three seismic sensors, 40, 41, 42 are shown mounted in cable 12 by way of example but many hundred may be used in actual practice. Strapped to the outside of the cable, are slave transponders 43, 44, 45. A preferred slave transponder, model 2410 is also made by DigiCOURSE. The transponder is self-activating, having its own Ni-Cad battery, and is usually fastened on the outside of the bottom cable in intimate, osculating contact with a selected submerged seismic sensor. The transponder operates in a frequency band several orders of magnitude above the seismic spectrum, namely 40 kHz and therefore does not interfere with seismic data. As before stated, master transponder 32 insonifies slave transponders 41-43 along ray paths 46, 47, 48. Since each transponder returns a uniquely-encoded signal along those same paths, signals from a given transponder identify the seismic sensor with which the transponder is associated.

It is of interest that the seismic sensors are identified in numerical sequence along the line of survey starting from some arbitrary origin. However the unique numeric codes assigned to the respective slave transponders are in random sequence. Thus, by way of example, slave transponder 17 might be assigned to seismic sensor 97 and transponder 31 might be assigned to seismic sensor 98. As a further complication, the unique code assigned to each transducer associated with a particular seismic sensor is not necessarily known a priori.

Transponder signals are confined to line-of-sight with a range, R, of about 500 meters as before stated. The 40-kHz transponder signals do not suffer the problems of refraction and reverberation as do the sub-audio seismic signals. Because of the relatively short flight paths, wide-angle reflections do not occur. On the other hand, structures such as offshore oil platforms will create interrogation-signal/reply-signal shadow zones such that the flight paths for some range measurements may be blocked. For statistical reasons, a range determination to be valid, is required to be derived from at least a minimum number, Y, of separate clear unobstructed range measurements. Furthermore, an acceptable range measurement must originate from a transponder that is nominally "in sight" that is within the nominal 500-meter range limit.

Figure 3:
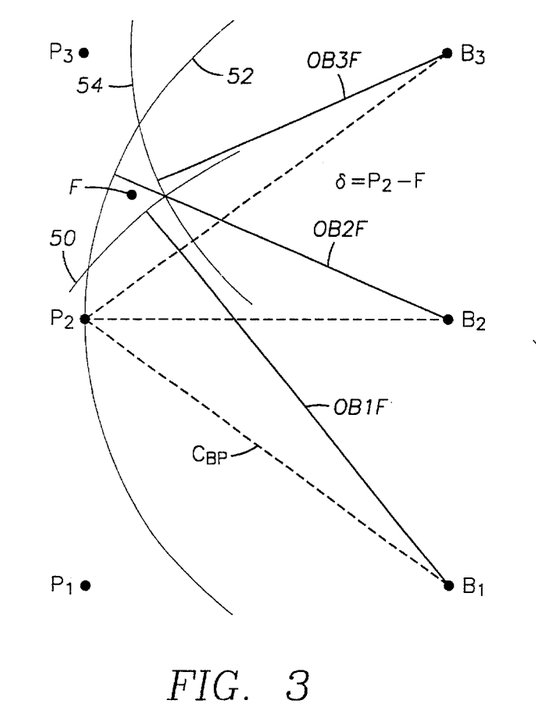
FIG. 3 schematically shows the manner of resolving the location of a transponder with respect to the known locations of a utility boat.

The mechanics of obtaining a fix, that is, the actual position of a slave transponder, are summarized in FIG. 3. The desired preplotted positions of the seismic sensors lie at the locations $P_j$ such as is shown at $P_2$. The calculated ranges $CB_iP_j$ as derived from a preplotted tabulation are shown by the dashed lines for three known boat locations $B_i$ occupied by a utility boat at B1, B2, B3. The utility boat makes three observed range measurements $OB_iF_m$ from the three known positions $B_i$ to the actual location $F_m$ of slave transponder $T_k$. With positions $B_1$, $B_2$ and $B_3$ as centers, arcs 50, 52 and 54 are drawn. The actual position or fix, $F_m$, of a slave transponder is somewhere inside the triangle formed by the three arcs as shown.

Figure 4:
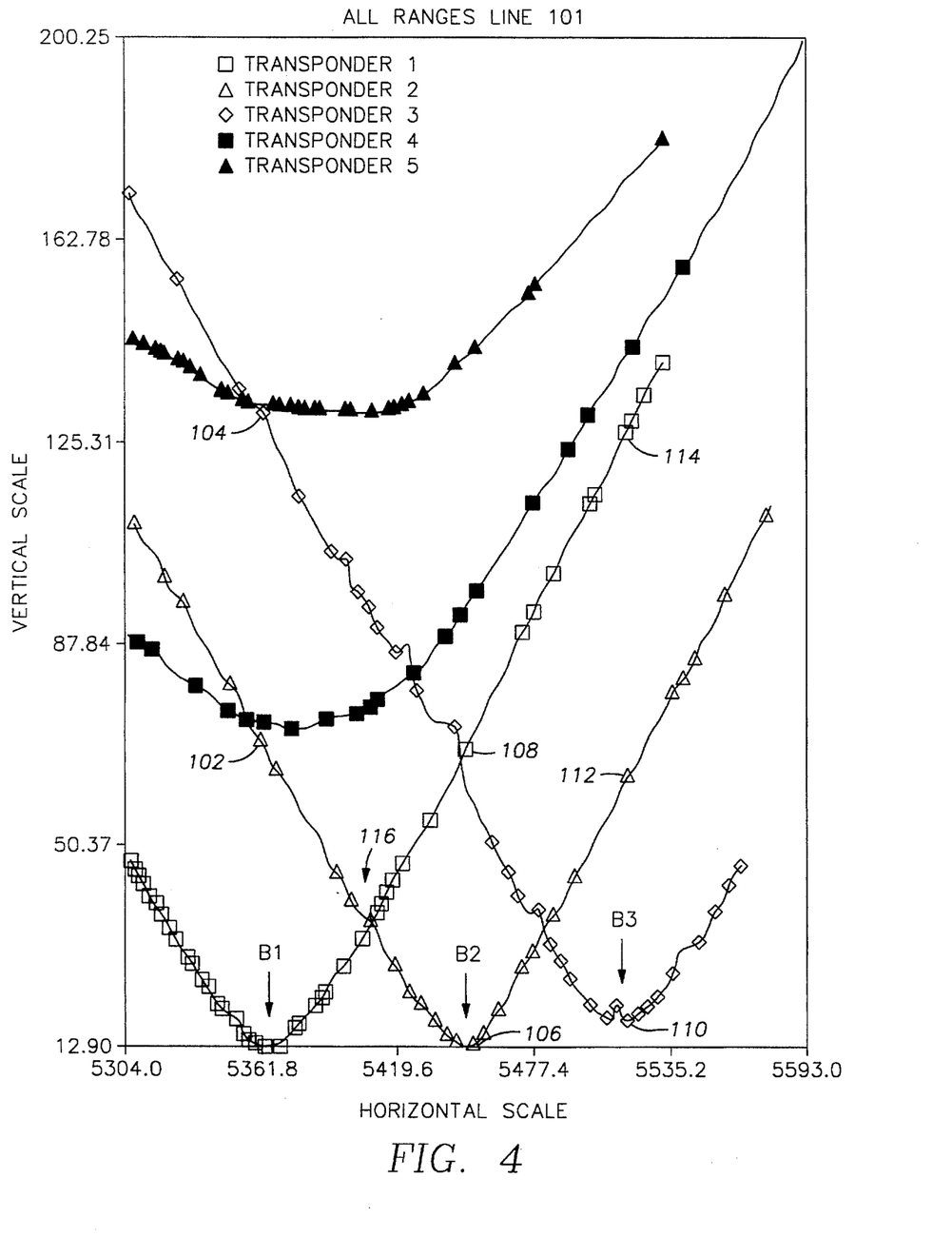
FIG. 4 illustrates the hyperbolic pattern of range measurements from three boat positions, B1, B2, B3.

FIG. 4 shows hyperbolic sets of range measurements to different transducers from three different boat locations (x-axis) such as $B_1$, $B_2$, $B_3$, of FIG. 3, in terms of two-way travel time in milliseconds (y-axis). Transducers 4 and 5 (crosses and x's) are laterally offset from the main line of transducers 1, 2, and 3. At location $B_1$, a gather of range measurements 100, 102 and 104 are obtained for transducers 1, 2 and 3. At $B_2$, the range measurement gather includes 106 and 108 but a value for transponder 3 is missing. Finally, at $B_3$, the range measurement gather includes three values at 110, aa2, and 114. Measurement ambiguities may exists where the hyperbolae cross such as at 104 and 116.

Figure 5:
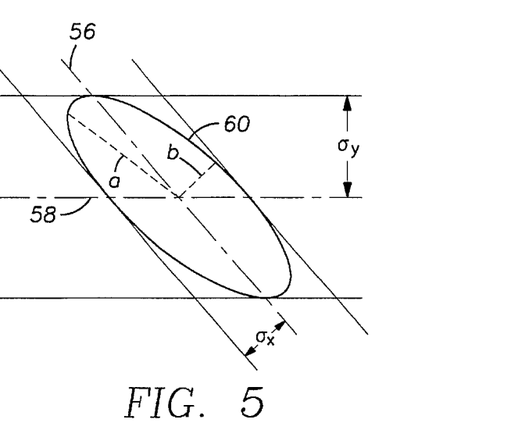
FIG. 5 is an explanation of an error ellipse.

As is well known, the dimensions of the triangle enclosing a fix such as at $F_m$, FIG. 3, may be used to provide an estimate of the goodness of the fix. Refer to FIG. 5. Two range measurements comprise intersecting lines of position 56 and 58. The standard deviations for the two sets are $\sigma_x$ and $\sigma_y$ as shown. An error pattern, having semi-major axis $a=\sigma_x$ and semi-minor axis $b=\sigma_y$, may be drawn as shown. Preferably, the lines of position 56 and 58 are orthogonal with $\sigma_x=\sigma_y$ such that the error pattern is a circle and the circularity, E (the reciprocal of the ellipticity) is 1.0. In actual practice, the circularity will be less than 1.0 but greater than 0.0. An arbitrary limiting value for E may be designated.

The circularity parameter is useful for two purposes: 1) It serves as a measure of the usefulness of the intersecting lines of position in defining a fix. Positions derived from use of very acute or very obtuse angular intersections are indeterminate. 2) The circularity may be considered to be a measure of the uniformity of the distribution of the range measurements about the fix location.

A statistical measure of the error limit of the estimated position fix is provided by the Horizontal Dilution of Precision or HDOP. HDOP is the radial error of estimate divided by the range error. For purposes of this disclosure, the range error is assumed to be constant and equal to unity. The radial error is calculated from $$HDOP=(\sigma_x^2+\sigma_y^2)^{1/2}.$$

In operation, the limiting value for HDOP is an arbitrarily assigned value, X.

In accordance with the best mode of operation of this invention, certain criteria are required of the range measurements for an acceptable fix:

i) $1.0 \geq E > 0$;

ii) HDOP<X;

iii) $OB_iF_m > Y$;

iv) τ<0.600 sc (R<500 m);

v) $OB_iF_m \pm \delta = CB_iP_j$, where δ is a preselected radial departure between the actual and the preplotted positions of a seismic sensor. If these criteria are not met, the realization of the fix calculation is suppressed.

Figure 6:
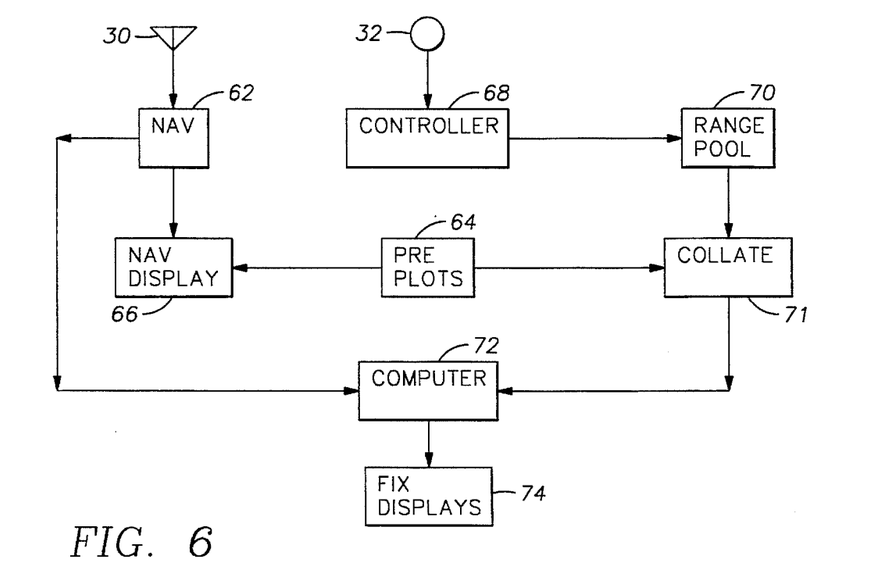
FIG. 6 is a schematic block diagram of the method of processing range data.

FIG. 6 is a schematic block diagram showing the data processing flow. A pre-plot tabulation PR of seismic sensor positions $P_j$ is entered into the navigation receiver 62 through any convenient means such as a numeric keyboard 64. Tabulation PR is also input to collating means 71, to be described below. With the aid of navigation receiver and NAV display 66, the utility boat is guided parallel to the desired traverse, preferably offset by 75–100 meters. At selected intervals, such as once every one or two seconds as utility boat proceeds down a line of traverse, sequentially occupying boat positions $B_i$, master controller 68 executes an broadcast-listen cycle to provide a gather of range measurements to those slave transponders that are within sight. The utility boat travels at about six knots or about 3 meters per second. The maximum listening time is 0.6 second and, since we are dealing with two-way flight times between master and slave transponders, the utility boat can gather range measurements from transponders that are within sight about every three to six meters at an interrogation rate of one to two seconds. From a practical standpoint, obstructions, noise and other problems limit the number of measurements in any one range gather. Each gather of encoded range measurements as received by master transponder 32 is delivered from the master controller 68 to range pool 70.

Range pool 70 may simply be a portion of a computer memory where the respective encoded range measurements are stored. The measurements within the gathers are collated, in a collating means 71, with those seismic sensor preplot positions that are known to be associated with transponders. As with the range pool, collating means 71 may be a portion of a programmed computer of any well known type.

At this point, the ident of a transponder associated with a particular seismic sensor is not known. At this stage, the current position of the boat 24 is compared with the positions stored on the preplot tabulation PR. The closest transponder is identified which potentially could be the source of the ranges stored in the range pool. The process is used to infer the identity of a potential transponder, using a simple search algorithm based on the hyperbolic nature of the range versus track system behavior.

From the preplot tabulation and the known boat position, for each range gather that meets the acceptability criteria above listed, a calculated range, $CB_iP_j$, may be derived for each seismic sensor having an associated transponder such as $T_k$. An individual observed range $OB_iF_m$ selected from the range gather, is compared with the calculated ranges resident in the range pool by collating means thus:

IF an observed range compares favorably with a corresponding calculated range, $\pm\delta$, where $\delta$ is an operator-assigned departure limit, that is if $OB_iF_j\pm\delta=CB_iP_j$, where $\delta$ is an arbitrary radial departure limit such as 10 meters, AND that range is UNAMBIGUOUS with respect to another range associated with a different unassigned preplot location, THEN assign identifiable transponder $T_k$ to preplot position $P_j$, ELSE select the next range in the range pool for processing.

It is inevitable that, in a large array of sensors, there will be duplicate ranges but that involve different transponders, resulting in ambiguous measurements as shown in FIG. 4. To resolve ambiguities, it is required that several range observations to a given slave transponder must be made from different boat positions before the corresponding range gather is accepted.

The actual locations of the slave transducers and their accompanying seismic sensors are computed by resolving the range measurement gathers, attributable to identifiable slave transducers, about the instantaneous utility-boat position at the pulse broadcast moment. The calculations may be performed in suitably-programmed computer 72 using any well-known navigation program as previously explained. Calculating an estimate of the coordinates of F may be done with the aid of any one of a number of well-known statistical algorithms such as least-squares linear regression or by a Kalman-filter algorithm such as outlined in *Kalman Filtering and its Application to Offshore Position Fixing*, by P. A. Cross, presented at the Fifth Annual International Symposium of the Hydrographic Society, Dec., 1986, which is incorporated herein by reference as non-essential material. Such well-known calculation methods per se form no part of this invention.

A display of the ranges that support the final locations and radial departures of the identifiable transponders and their assigned seismic sensors may be made in display unit 74 which may be a conventional computer monitor device of any desired type or a hard copy printout. If the radial departure from a preordained preplotted position exceeds a preselected value such as 25 meters, a corrective activity is executed. For example, the affected seismic sensor(s) may be moved back to their desired locations. Alternatively, the shooting pattern can be altered to fit the actual locations of the bottom cable.

Figure 7:
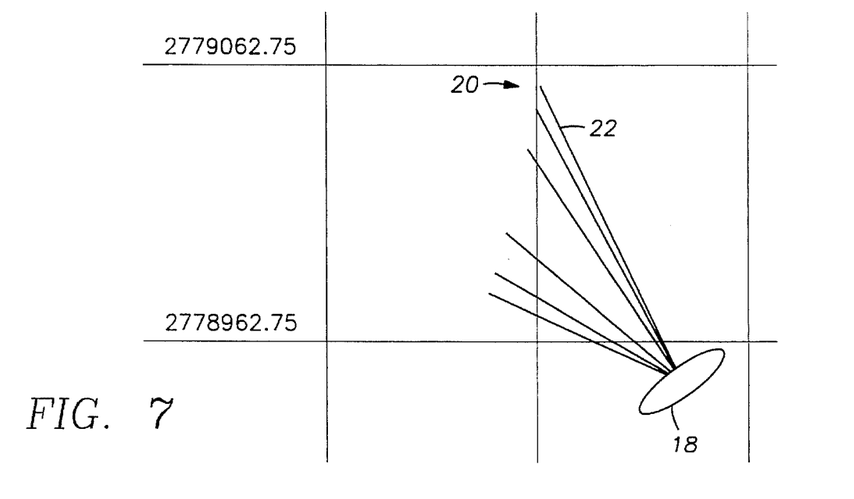
FIG. 7 is an example of range measurements focussed on an identifiable slave transponder.

FIG. 7 is a set of six range measurements that provide a fix represented by error ellipse 18. The boat positions are located at the free ends of each range-radial such as 22. The error ellipse has been enlarged ten times for visibility. The circularity is 0.27 and the HDOP is 1.60 meters.

Figure 8:
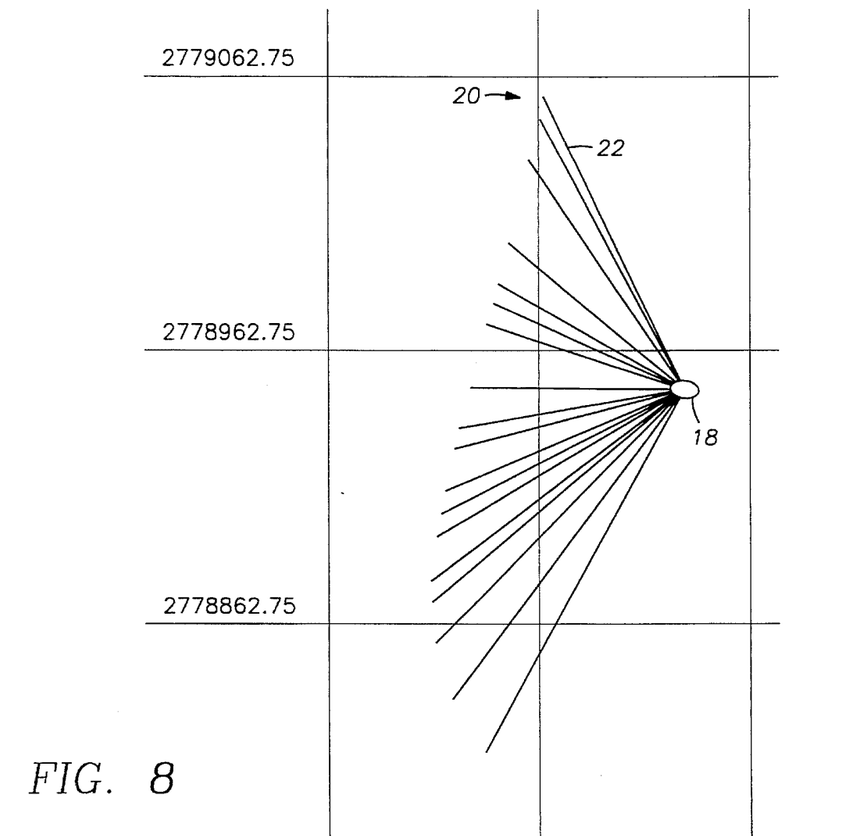
FIG. 8 shows the results of including more range measurements in defining the location of a transponder.

FIG. 8 shows the improved circularity and HDOP of FIG. 7 that results when another dozen ranges enter the position solution. A more uniform distribution of the range measurements contributes to better circularity which is 0.60 As before, the error ellipse is magnified ten times.

Figure 9:
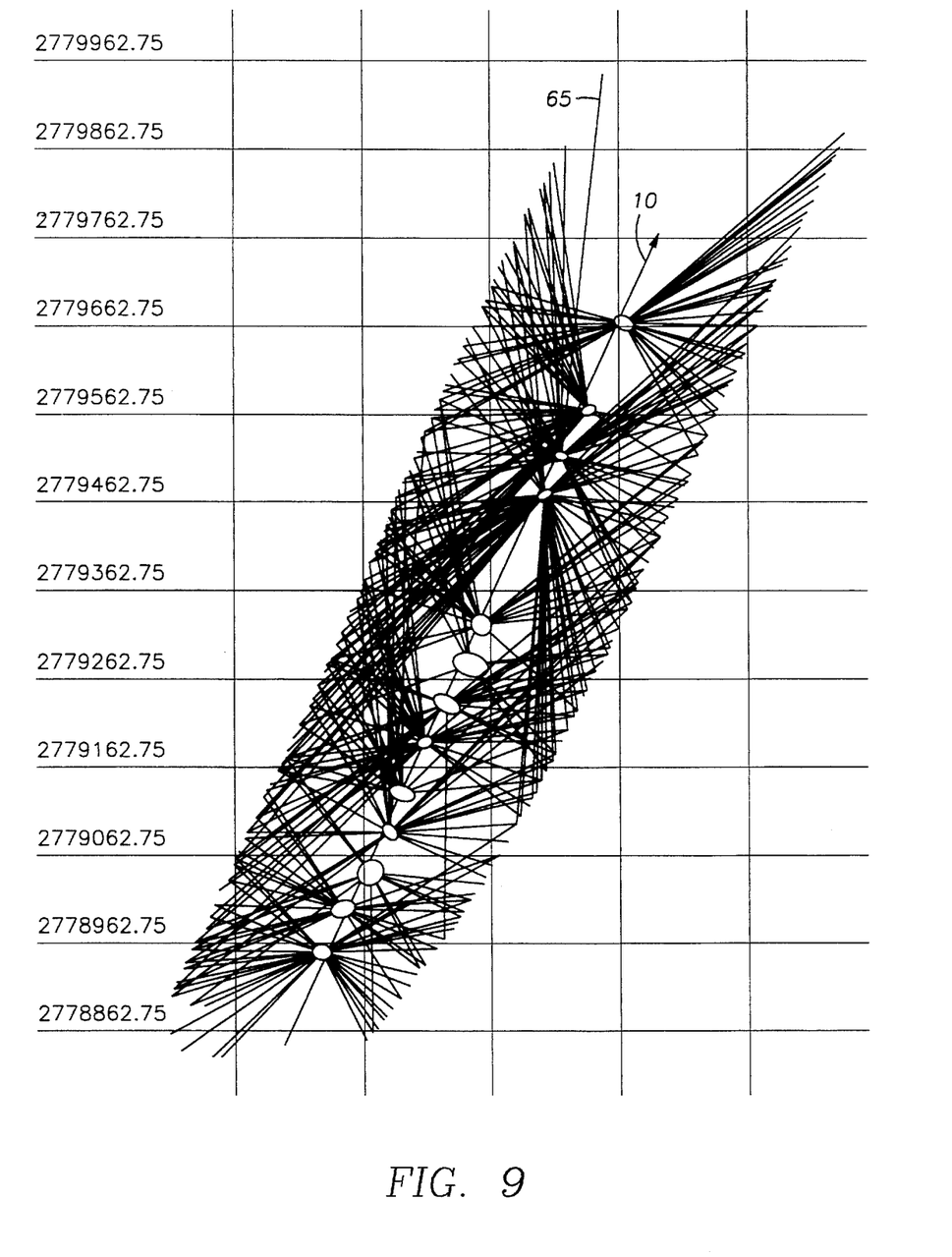
FIG. 9 shows the results of a two-pass survey of the bottom cable.

FIG. 9 shows the results of a two-pass verification test run wherein the utility boat has proceeded down the northwest side of survey line 10 and returned along the southeast side of the line of survey. The map grid is divided into 100-meter blocks. The error ellipses are enlarged ten times. The deviations of the transducers from the line are very small—on the order of a few meters. Two areas near the center of the line appear to lack transponder returns and the returns are sparse for at least two other transponders in the same area which may have been caused by obstructions in the water. Range line 65 may be a rogue measurement.

This invention has been described with a certain degree of specificity. For example, the invention has been described in terms of marine seismic exploration by way of example but not by way of limitation. The method can be applied to any situation involving submerged acoustic sensing devices. Those skilled in the art will devise obvious variations to the examples given herein but which will fall within the scope and spirit of this invention which is limited only by the appended claims.

What is claimed is:

1. A system for estimating the locations of the members of a submerged array of seismic sensors landed on the water bottom, comprising:

a plurality of acoustic slave transponders, each slave transponder being associated with a selected member of the seismic sensor array, each slave transponder including means for emitting a unique encoded reply in response to a master interrogation pulse;

a utility boat;

a vertically-disposed swing pole secured to a gunwale of said utility boat, the top of said swing pole being exposed to the free air, the bottom of said swing pole being submerged;

a navigation means for continuously providing the instantaneous coordinates of said utility boat, said navigation means including a signal-receiving antenna fastened to the top of said swing pole;

a master acoustic transponder fastened to the bottom of said swing pole;

a controller means operatively coupled to the master transponder for causing said master transponder to repeatedly broadcast a master interrogation pulse at timed intervals and for subsequently receiving a uniquely encoded reply in response thereto from said plurality of slave transponders;

means coupled to said controller for measuring the two-way flight times of the interrogation pulse between said master transponder and each of the plurality of slave transponders to provide range gathers during each timed interval;

a range pool means for receiving a plurality of range gathers;

collating means for receiving preplots of desired seismic sensor locations, interconnected with said range pool means, for assigning a desired number of unambiguous range measurements selected from different range gathers to the appropriate slave transponders;

means interconnected with said navigation means and said collating means, for resolving the range measurements assignable to each said slave transducer with the corresponding instantaneous coordinates of said utility boat to provide an estimate of the locations of the respective members of the seismic sensor array with which each of the slave transponders are associated.

2. A method for estimating in real time, the spatial distribution error, with respect to a preplotted line of survey, of the respective members of a seismic sensor array previously deployed along said line and landed on the water bottom, the method using the system as defined by claim 1, comprising the steps of:

navigating said utility boat along said preplotted line of survey with the aid of said precision navigation means;

gathering sets of range measurements assignable to the respective slave transponders into said range pool following repeated broadcasts of the master interrogation pulse at timed intervals;

resolving said sets of range measurements about the coordinates of said boat at a selected broadcast instant to define the transponder locations;

comparing the so-defined transponder locations with the preplotted seismic sensor coordinates received by said collating means, thereby to identify the transponder most likely assigned to each said seismic sensor; and executing a corrective action when the radial departure from a preplotted position exceeds a preselected value.

3. The method as defined by claim 2, comprising:

resolving range ambiguities by requiring that a preselected minimum number of ranges, assignable to a specific identifiable slave transponder, must be gathered from different boat locations to provide a valid range measurement set.

4. The method as defined by claim 3, comprising:

calculating the horizontal dilution of precision (HDOP) of the estimate of the position of each said slave transponder and its associated seismic sensor; and suppressing the realization of a seismic sensor fix location whose associated HDOP determination exceeds a desired value.

5. The method as defined by claim 3, comprising:

suppressing the realization of a seismic sensor location whose associated circularity that is less than a preselected value.

6. The method as defined by claim 2, comprising:

verifying that an identifiable slave transponder, for which a gather of range measurements has been made, is within sight.

7. The method as defined by claim 2, wherein acceptable range measurements must fulfill the criteria that:

i) $1.0 \geq E > 0.0$;

ii) $HDOP < X$;

iii) $OB_iF_m > Y$;

iv) $T < 0.600$ sec ($R < 500$ m); and v) $CB_iP_j \pm \delta = OB_iF_m$ where $E$= circularity, $X$ and $Y$ are preselected tolerances, $OB_iF$ is an observed range, $CB_iF_M$ is a calculated range and $\delta$ is the radial departure.

* * * * *